(12) United States Patent
Axelsson et al.

(10) Patent No.: US 8,387,565 B2
(45) Date of Patent: Mar. 5, 2013

(54) MILKING PARLOUR AND METHOD FOR OPERATING THE SAME

(75) Inventors: Thomas Axelsson, Farsta (SE); Gert Danneker, Grodinge (SE); Jan Eriksson, Uttran (SE)

(73) Assignee: DeLaval Holding AB, Tumba (SE)

( * ) Notice: Subject to any disclaimer, the term of this patent is extended or adjusted under 35 U.S.C. 154(b) by 380 days.

(21) Appl. No.: 12/741,039

(22) PCT Filed: Sep. 19, 2008

(86) PCT No.: PCT/GB2008/003169
§ 371 (c)(1),
(2), (4) Date: May 3, 2010

(87) PCT Pub. No.: WO2009/063155
PCT Pub. Date: May 22, 2009

(65) Prior Publication Data
US 2010/0236485 A1    Sep. 23, 2010

(30) Foreign Application Priority Data
Nov. 16, 2007 (EP) .................................. 07254492

(51) Int. Cl.
*A01K 1/12* (2006.01)
*A01J 5/003* (2006.01)
(52) U.S. Cl. .................................. 119/14.02; 119/14.04

(58) Field of Classification Search .............. 119/14.02, 119/14.03, 14.08, 14.1, 14.18
See application file for complete search history.

(56) References Cited

U.S. PATENT DOCUMENTS

| 7,484,474 B2 * | 2/2009 | Van Den Berg et al. ... 119/14.02 |
| 2008/0202432 A1 * | 8/2008 | Petterson ................... 119/14.03 |
| 2011/0061596 A1 * | 3/2011 | Nilsson et al. ............. 119/14.08 |

FOREIGN PATENT DOCUMENTS

| EP | 0 689 762 | 1/1996 |
| EP | 1 523 881 | 4/2005 |
| WO | 94/09616 | 5/1994 |
| WO | 97/37530 | 10/1997 |
| WO | 2007/142586 | 12/2007 |

OTHER PUBLICATIONS

International Search Report dated Feb. 5, 2009, from corresponding PCT application.

* cited by examiner

*Primary Examiner* — Rob Swiatek
*Assistant Examiner* — Ebony Evans
(74) *Attorney, Agent, or Firm* — Young & Thompson

(57) ABSTRACT

An apparatus for milking an animal and provides a milking parlor (1) including first and second robotic manipulation devices (100, 200) and a plurality of milking stalls (5) provided on a platform (3) moveable relative to the robotic manipulation devices (100, 200) wherein the robotic manipulation devices (100, 200) are positioned so as to be capable of simultaneously servicing neighboring milking stalls (5) on the platform (3).

27 Claims, 4 Drawing Sheets

MILKING PARLOUR AND METHOD FOR OPERATING THE SAME

BACKGROUND OF THE INVENTION

1. Field of the Invention

The present invention relates to a milking parlour and a method for operating the same and particularly, but not exclusively, to a rotary milking parlour for milking an animal, such as a cow, and to a method for operating the same.

2. Description of the Related Art

There are various types of milking parlour known in the dairy industry and the present invention is of particular relevance to what is commonly referred to as a rotary milking parlour. This type of parlour is provided with a comparatively large number of milking stalls arranged in a circular configuration on a rotating annular platform and is of particular use in handling a large number of animals. The platform rotates at a relatively low constant speed so that a cow may readily step onto the platform from a stationary holding bay and thereby gain access to a stall. If deemed necessary by an operator, the rotary movement of the platform may be stopped momentarily in order to allow a cow sufficient time to enter (or exit) the platform. The continued rotation of the platform then moves the stall into a position where an operator can perform certain tasks (such as teat cleaning and placement of teat cups on the teats) so as to allow the milking process to begin. The speed of rotation is such that the milking process will have been completed by the time a stall has moved from the cow entry position (where a cow gains entry onto the platform) to a cow exit position (where a cow is permitted to leave the platform). The cow entry and exit points are adjacent one another so as to maximise the time a cow spends in the milking stall.

It will be understood that cows may constantly enter and exit a rotary parlour without necessarily stopping the platform rotation and this allows for a large number of cows to be handled. It will be also understood that the movement of the platform results in cows being brought to an operator in turn. The operator is therefore able to remain in one location and concentrate on essential milking tasks without interruptions.

There are two main types of rotary milking parlour system, which may be referred to, as the Parallel Rotary system and the Herringbone Rotary system.

In a Herringbone Rotary system, a cow stands in a stall facing diagonally towards the outside of an annular rotating platform, in the general direction of rotation. One or more operators stand on the inside of the rotating platform and are thereby provided good access to the side of each cow. Milking equipment is positioned alongside each cow on the inside edge of the platform.

In a Parallel Rotary system, a cow stands in a stall of a rotating platform so as to face radially inward towards the centre of rotation of the platform. Operators stood outside the rotating platform are then able to work from the rear of each cow as the cow passes in turn. Because the cows are positioned side by side, the parallel rotary system allows more cows to be accommodated in the same space.

In each of these types of rotary parlour, each milking stall is provided with a cluster of four teat cups. These teat cups are attached to the teats of a cow located within the stall so as to allow said cow to be milked. Once the milking process has been completed, an automatic retraction system is typically used to remove the four teat cups simultaneously from the teats. Such a system comprises a cord which is attached to the teat cup cluster and which is retracted automatically at an appropriate time so as to pull the teat cup cluster from the cow.

A problem associated with rotary milking parlours is that an operator only has a limited amount of time in which to service a milking stall before the milking stall moves beyond the reach of the operator. An operator may service a milking stall in a number of ways, for example, an operator will typically service a milking stall by moving teat cups from a storage position into a position where they are attached to the teats of a cow stood within the milking stall. Although a teat cup cluster will be typically attached to the teats of a cow before the milking stall has moved a significant distance, unpredictable events such as movement by an unsettled cow can significantly delay the teat cup attachment process. This is not necessarily problematic when a human operator services the milking stalls because the operator can walk with the rotating platform and remain with the particular stall experiencing the delay. However, delays in servicing a stall can be problematic in circumstances where a robot arm is being used for the servicing activity. This is because the robot arm has a fixed position within a milking parlour and so a milking stall will tend to move quite rapidly beyond its reach. This problem is also a particular issue when the speed of the milking stalls is comparatively high. This may be found in large rotary parlours where the linear tangential speed of a stall will be comparatively high for a given angular speed because of the comparatively large platform radius.

BRIEF SUMMARY OF THE INVENTION

A first aspect of the present invention provides a milking parlour comprising first and second robotic manipulation devices and a plurality of milking stalls provided on a platform moveable relative to the robotic manipulation devices; wherein the first and second robotic manipulation devices are positioned so as to be capable of simultaneously servicing neighbouring milking stalls on the platform; the parlour being characterised in that each robotic manipulation device comprises an arm which is sufficiently extendable to service both a first stall positioned immediately adjacent the robotic manipulation device and a second stall neighbouring the first stall.

A second aspect of the present invention provides a method of operating a milking parlour according to the first aspect of the present invention; the method comprising the step of controlling the first and second robotic manipulation devices so that said devices simultaneously service different neighbouring milking stalls on the platform.

A milking parlour is described below as comprising first and second robotic manipulation devices and a plurality of milking stalls; wherein information regarding the activity of a robotic manipulation device is sent electronically from said device. Information regarding one of said robotic manipulation devices may be communicated electronically to the other of said robotic manipulation devices. Ideally, information regarding the activity of said two robotic manipulation devices may be exchanged electronically between said devices. Furthermore, the information may comprise data recording the current real-time position of a robotic manipulation device and/or the number of teat cups successfully attached to a cow positioned in a milking stall currently being serviced by a robotic manipulation device. Ideally, the plurality of milking stalls are provided on a platform moveable relative to the robotic manipulation devices.

A milking parlour is described below as comprising a first robotic manipulation device and a plurality of milking stalls provided on a platform moveable relative to the robotic manipulation device; and the parlour further comprising an entrance preventing, in use, entry to the platform of more than one animal at any one time; and the parlour being characterised by a second robotic manipulation device wherein the first and second robotic manipulation devices are positioned so as to be capable of simultaneously servicing neighbouring milking stalls on the platform.

Also described below is a method of operating a milking parlour having first and second robotic manipulation devices, a plurality of milking stalls provided on a platform moveable relative to the robotic manipulation devices, and an entrance preventing, in use, entry to the platform of more than one animal at any one time; the method comprising the step of controlling the first and second robotic manipulation devices so that said devices simultaneously service different neighbouring milking stalls on the platform.

It will be understood that through use of the present invention, a robotic manipulation device may be provided with additional time to service a milking stall. It will also be appreciated that the present invention thereby allows the speed of a platform stall to be increased. If necessary, the rate at which the robotic manipulation device is found to be completing a current activity (i.e. the performance of the robotic manipulation device) can be used to determine whether or not to use the means by which the additional time is provided. In other words, the performance of a robotic manipulation device may be such that the use of an associated second robotic manipulation device is not required.

Further advantageous optional features of the invention are set out in the appended dependent claims.

BRIEF DESCRIPTION OF THE DRAWINGS

An embodiment of the present invention will now be described with reference to the accompanying drawing, in which.

DETAILED DESCRIPTION OF THE PREFERRED EMBODIMENTS

Figure 1:
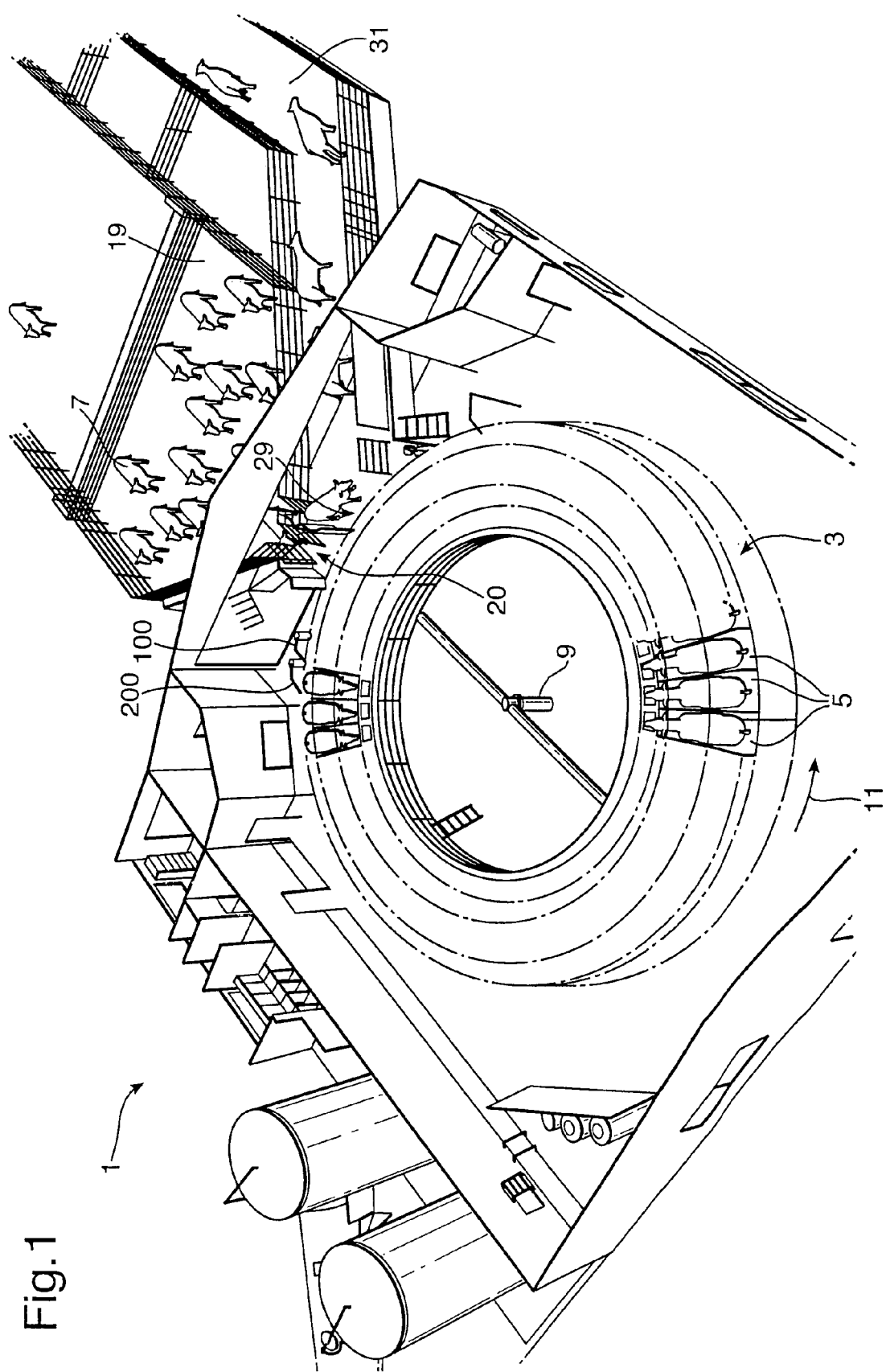
FIG. 1 is a schematic perspective view of a parallel rotary parlour according to the present invention.

A parallel rotary parlour 1 according to the present invention is shown in FIG. 1 of the accompanying drawings. The parlour 1 comprises a rotatable platform 3 having an annular shape and being provided with fifty milking stalls 5 arranged side by side circumferentially along the platform 3. Since the parlour 1 is of a parallel rotary type, the stalls 5 are arranged so that a cow 7 to be milked stands in a stall 5 facing radially inwards towards the centre 9 of rotation of the platform 3. In use, the platform 3 is rotated by suitable drive means in an anti-clockwise direction as indicated by arrow 11.

With reference to FIG. 1, it will be understood that cows 7 to be milked congregate in a holding bay 19 and walk onto the platform 3 one by one at a stall entry point 20. The entry point 20 comprises an animal walk way having a width substantially equal to that of a milking stall 5. This width is sufficient for an animal, such as a cow, to comfortably walk through the walk way and into a stall 5, but is not so great as to allow the passage of two animals side-by-side. In this way, animals are prevented from entering stalls 5 of the platform 3 simultaneously. It will be understood that the speed of rotation of the platform 3 is sufficiently low for a cow 7 to step onto the platform 3 and walk into a passing stall 5. It will also be understood that, once a cow 7 has entered a stall 5, further rotation of the platform 3 closes the stall 5 so as to prevent the cow 7 from backing out of the stall 5. Each stall 5 is provided with four teat cups connected to a conventional milking system by means of hoses. As will be explained in more detail below with reference to FIGS. 2 and 3, these teat cups 21a, 21b, 21c, 21d are automatically attached to the teats 23a, 23b, 23c, 23d of a cow by means of one of two robot arms 100, 200 which are moved by an electronic control system. Once the teat cups 21 are attached to the teats 23, the cow 7 is milked in a conventional fashion whilst the platform 3 continues to rotate. Once milking has been completed, the teat cups 21 are removed from the teats 23 by means of an automatic teat cup retraction system (not shown) which pulls on the hose 20 associated with each teat cup 21 and withdraws the teat cups 21 back into a teat cup magazine 27.

Each stall 5 is provided with a teat cup magazine 27 which comprises four recesses into which the four teat cups 23 locate when not in use. Each magazine 27 is located adjacent the entrance of the associated stall 5 so as to not unduly hinder access by a cow 7 to the stall 5 and so as to be positioned adjacent the rear of a cow 7 stood in the stall. The magazine 27 will therefore be understood to hold the teat cups 21 in a known storage position which is readily accessed by the robot arm 25 and which is sufficiently close to the teats 23 of the cow 7 to allow ready movement of the teat cups 21 to the teats 23 from the magazine 27.

Once the teat cups 21 have been retracted into the teat cup magazine 27, the milking stall 5 in which the cow 7 is located will shortly thereafter move to a stall exit point 29 (see FIG. 1). At the exit point 29, a stall 5 is arranged in an open configuration so that a cow 7 located therein may back out of the stall 5 and leave the parlour 1 by means of an exit walkway 31.

As mentioned above, the rotary parlour 1 of the present invention is provided with an automated system for attaching teat cups 21 to the teats 23 of a cow 7 to be milked. This automated system comprises two robot arms 100, 200 and an electronic control system. The electronic control system allows movement of the robot arms 100, 200 to be coordinated with the rotary movement of the platform 3. Suitable means for monitoring the rotary speed and position and the direction of rotation of the platform 3 is provided (not shown) and this information is used by the control system in order to ensure accuracy in coordinating the movements between the robot arms 100, 200 and associated stalls 5.

Figure 2:
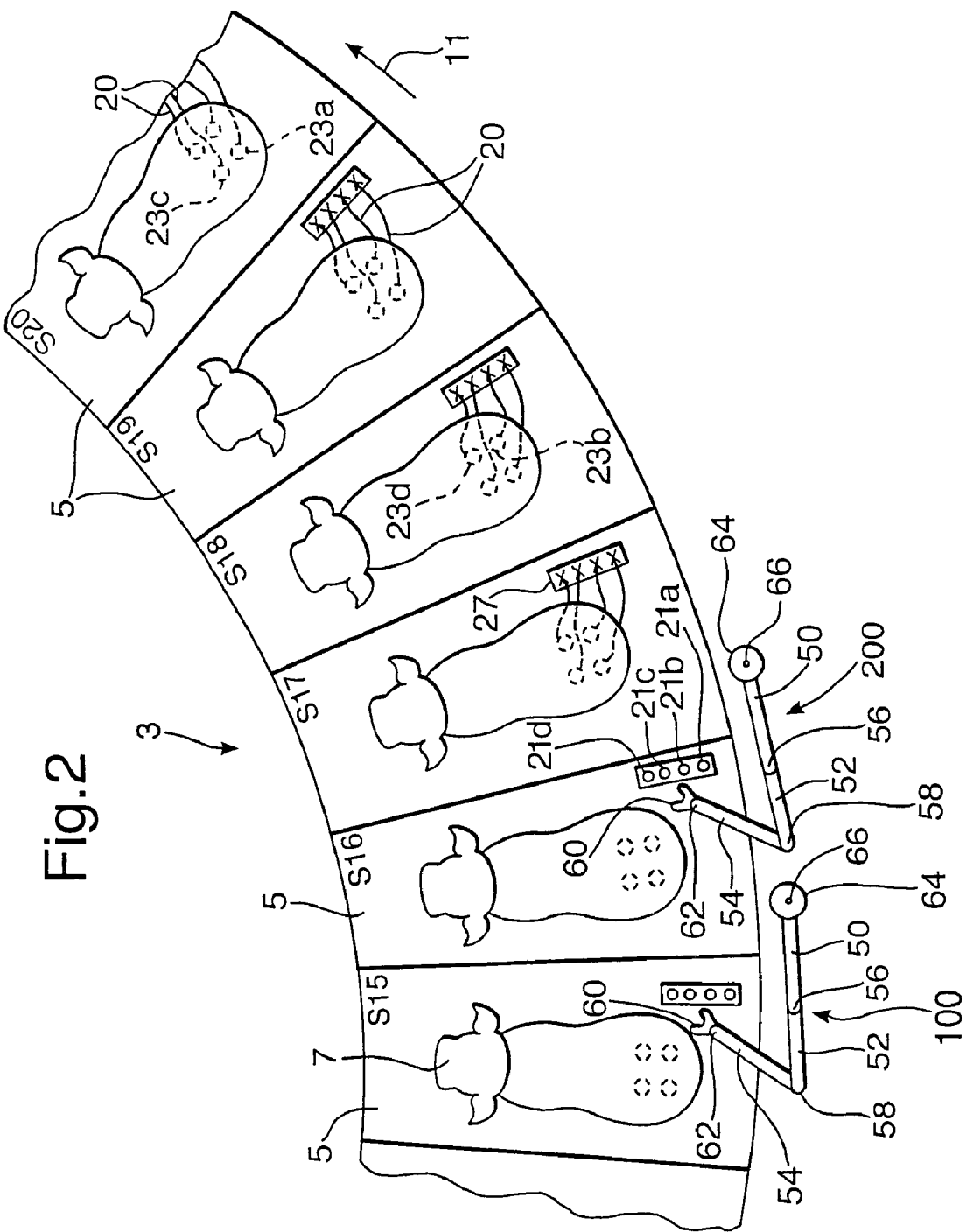
FIG. 2 is a schematic part plan view of the rotating platform of the rotary parlour shown in FIG. 1 wherein the platform is in a first rotary position and two robotic arms are each servicing a different milking stall by moving teat cups one by one from a teat cup magazine to the teats of a cow.
Figure 3:
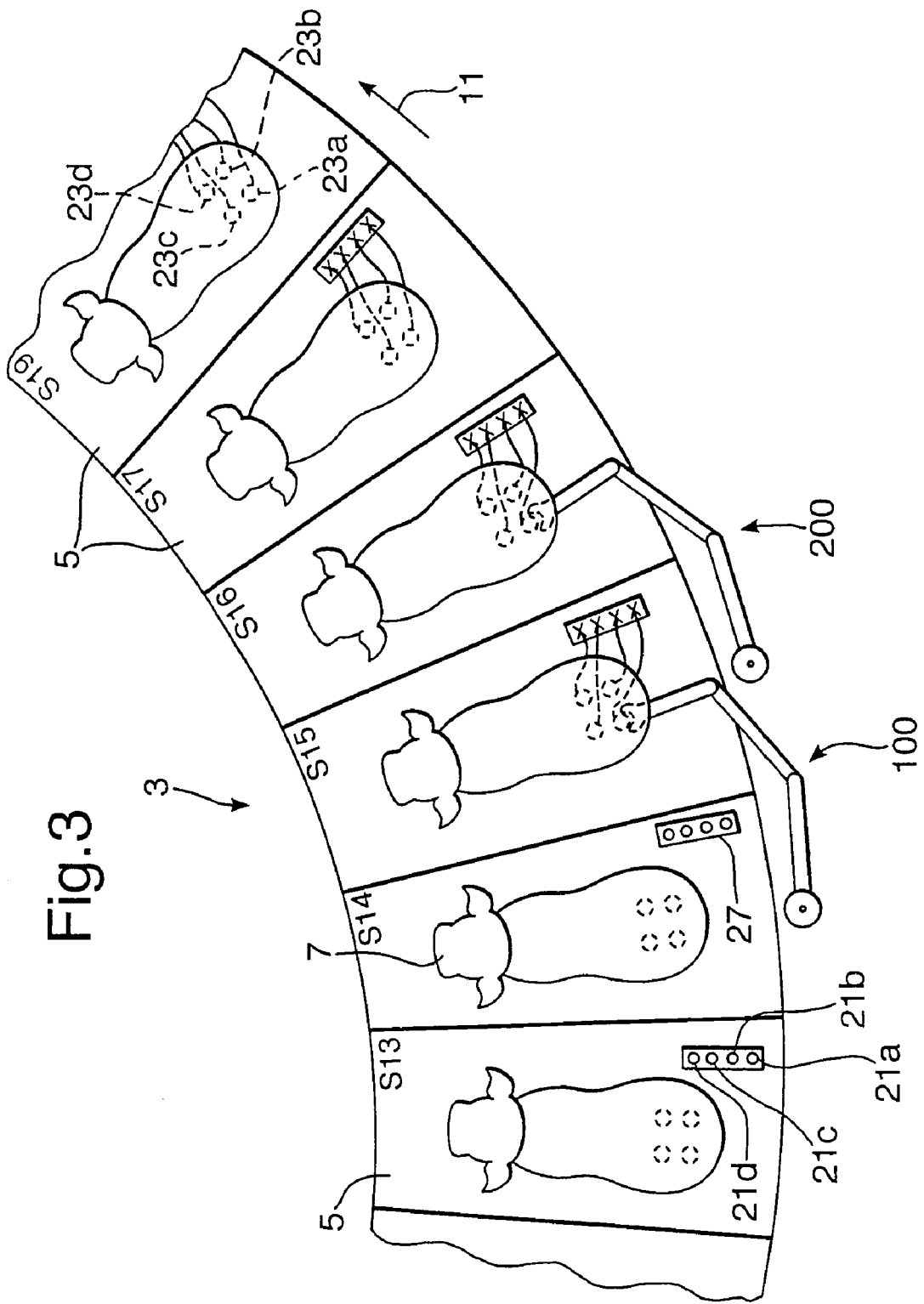
FIG. 3 is a schematic part plan view of the rotating platform of the rotary parlour shown in FIG. 1 wherein the platform is in a second rotary position and the two robotic arms are each completing the servicing of respective milking stalls.

In FIGS. 2 and 3 of the accompanying drawings, six milking stalls (numbered S15, S16, S17, S18, S19 and S20) are shown moving past the robot arms 100, 200. Alternative arrangements of robot arm may be provided and the schematic example shown in FIGS. 2 and 3 is provided merely for the purposes of illustrating the operation of the present invention. Specifically, each robot arm 100, 200 shown in FIGS. 2 and 3 comprises first, second and third arms 50, 52, 54 rotatably connected to one another by elbow joints 56, 58. Each robot arm 100, 200 further comprises teat cup carrying means. In the present embodiment, the teat cup carrying means is a teat cup gripper 60 pivotably connected to the third arm 54 at a wrist joint 62. However, in a particularly preferred alternative embodiment (not shown), a robot arm 100, 200 is provided with means for carrying two or more teat cups simultaneously. This carrying means may comprise an element having four recesses into each of which a teat cup may be received. Each robot arm 100, 200 also comprises a swivel unit 64 from which the first arm 50 extends. The first arm 60 is rotatable about a central axis 66 by means of the swivel unit 64.

The swivel units 64 of each robot arm 100, 200 are circumferentially spaced from one another by a distance equal to the width of a milking stall 5. Accordingly, it will be understood that the two robot arms 100, 200 operate to simultaneously service neighbouring stalls 5 of the platform 3. As shown in FIGS. 2 and 3, each robot arm 100, 200 services a stall in the same way by moving teat cups 21 in turn from a magazine 27 into attachment with the teats 23 of a cow 7.

In this regard, once a teat cup magazine 27 moves within reach of a gripper 39, the associated robot arm 100, 200 grasps a first teat cup 21*a* and moves said teat cup to an estimated position of a first teat 23*a*. The precise position of the first teat 23*a* is then determined in a conventional manner using an appropriate sensing device. Once the teat 23*a* has been accurately located, the robot arm 100, 200 then attaches the teat cup 21*a* to the teat 23*a*. This process is then repeated for the remaining three teat cups 21*b*, 21*c*, 21*d* in turn as the stall 5 continues to rotate on the platform 3.

It will be understood that the provision of the two robot arms 100, 200 means that each robot arm only needs to service every other milking stall 5. As such, each robot arm 100, 200 has additional time in which to complete a servicing activity.

The additional time for servicing a milking stall is dependent upon the working/operating range of the robot arm 100, 200. It will be appreciated that, in a conventional milking parlour having a robot arm, the robot arm is extendable so as to be capable of servicing no more than the milking stall positioned in its immediate vicinity. In other words, in a conventional milking parlour, a robot arm would be able to service the milking stall immediately adjacent the robot arm, but would not be able to extend a sufficient distance to service a neighbouring milking stall. In contrast, and with reference to FIG. 2 in particular, the milking shown in the accompanying drawings includes robot arms 100, 200 which extend sufficiently to service not only a milking stall located immediately in front of said arm, but also the two milking stalls located on either side of said stall. Specifically, it will be appreciated that the milking stall numbered S16 is positioned immediately adjacent the first robot arm 100. The swivel unit 64 of the first robot arm 100 is located on an extended centre line of the milking stall numbered S16 (i.e. an imaginary radial line positioned midway between the radial side walls of the stall). With the first robot arm 100 and platform 3 in this relative position as shown in FIG. 2, the working/operating range of the first robot arm 100 is sufficient to allow said arm to service a milking stall as it moves from the position of the milking stall numbered S15 in FIG. 2 to the position of the milking stall numbered S16. Indeed, the first robot arm 100 is extendable so as to continue to service a milking stall as it moves beyond the position of the milking stall numbered S16 in the direction of arrow 11 as shown in FIG. 2. It will be appreciated that the first robot arm 100 has a working/operating range spanning the width of three milking stalls (numbered S15, S16 and S17 in FIG. 2).

With regard to FIG. 2, it will be seen that the second robot arm 200 begins servicing the milking stall numbered S16 when this stall has moved approximately half way past the first robot arm 100. At this time, the first robot arm 100 simultaneously begins servicing the milking stall numbered S15 neighbouring the milking stall numbered S16. It will be understood that the next stall to be serviced by the second robot arm 200 is the stall numbered S14 and the second robot arm 200 does not need to begin servicing this next stall until that stall has moved halfway past the first robot arm 100. Each robot arm 100, 200 therefore has an extended period of time in which to service a stall 5 as a consequence of there being two robot arms. As shown in FIG. 3, the robot arms 100, 200 have completed servicing their respective milking stalls 5 by the time the next stalls to be serviced have moved within reach. As will be seen with reference to FIG. 3, the stall numbered S14 has moved halfway past the first robot arm 100 and will shortly be serviced by the second robot arm 200.

It will be appreciated that, in servicing stalls simultaneously, the robot arms 100, 200 may theoretically undertake the same actions at the same time. In other words, both robot arms 100, 200 may, for example, attach their respective second teat cups 21*b* to a teat in the same moment. However, in practice, the robot arms are likely to be delayed to differing extents (typically because of animal movements) so that, although different stalls are simultaneously serviced, the robot arms 100, 200 undertake different actions at any given time. Indeed, it is to be emphasised that a first robot arm may be delayed to such an extent that the other robot arm begins servicing its next stall before the first robot arm has completed its servicing tasks and is also able to move to its next stall. For example, the robot arms 100, 200 in FIG. 3 are illustrated as attaching their respective fourth teat cups to a teat at the same time, however in practice it will be appreciated that the first robotic arm 100 may well have encountered fewer delays in its teat cup attachment than the second robot arm 200 and would therefore have already begun servicing its next milking stall numbered S13. Accordingly, the two robot arms 100, 200 would then be simultaneously servicing milking stalls numbered S13 and S16.

It will therefore be appreciated that the robot arms 100, 200 operate entirely independently of one another in that one robot arm does not reduce its rate of teat cup attachment in order to keep pace with a delayed robot arm. Nevertheless, the control system coordinates the movement of the robot arms 100, 200 so as to ensure the robot arms 100, 200 do not collide with one another. It will be appreciated that the risk of a collision is comparatively high when the stalls being serviced require the robot arms 100, 200 to cross one another. For example, the second robot arm 200 in FIG. 3 may well, in practice, experience fewer delays in teat cup attachment than the first robot arm 100 and therefore be able to begin servicing its next stall (the milking stall numbered S14) before the first robot arm 100 has completed its servicing of the milking stall numbered S15. In these circumstances, the two robot arms 100, 200 will cross one another in simultaneously servicing the milking stalls numbered S14 and S15. The electronic control system and method used to avoid collision of the two robots 100, 200 is described in greater detail below.

In a further embodiment, the electronic control system may be adapted to allow a robot arm 100, 200 to service the same milking stall as the other robot arm 100, 200. A robot arm may operate in this way temporarily, for a short period of time, in circumstances where said robot arm has suffered very few delays in its teat cup attachment and as a result has a surplus of time in which to assist a further robot arm which has been delayed in its teat cup attachment. Such a coordinated servicing of the same milking stall may obviate the need to reduce platform rotation speed. Once the assistance has been provided by a particular robot arm, that robot arm then reverts to servicing its own milking stalls.

The robot arms 100, 200 may be provided with one or more proximity sensors which detect when the robot arm is in close proximity to, for example, the leg of a cow 7 or an item of milking equipment.

Also, although only schematic robot aims 100, 200 have been described above for the sake of simplicity, prior robots used in the milking industry have up to six axes of movement and is envisaged that similar robots would be used in practice in the milking parlours described herein.

Furthermore, a robot arm having seven axes of movement may be used in the place of the schematic robot arms 100, 200 specifically described above. Such a robot arm has one axis of movement in addition to the six axes of movement conventionally found in a milking robot, and this additional axis of movement is of particular assistance in avoiding the legs of a cow and/or milking equipment (as detected by a proximity sensor on the robot arm). The additional axis of movement is of particular use where two robots are employed since the additional flexibility of movement provided by the additional axis allows the two robot arms to more readily avoid one another and generally move in a coordinated fashion.

It will also be understood that either one or both of the two robot arms 100, 200 shown in FIGS. 2 and 3 may be supported on a base moveable in the direction of arrow 11, for example, on a telescopically extendable element. In this way, the robot arms 100, 200 of FIGS. 2 and 3 may be moved in the general rotary direction of the platform 3 so as to provide additional time, if required, in order to complete a servicing activity.

Figure 4:
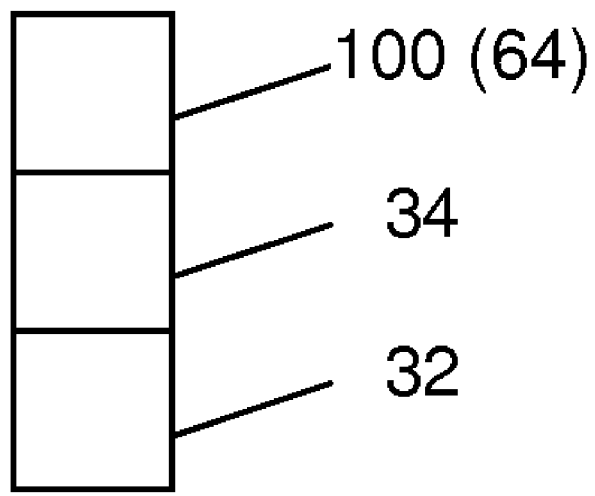
FIG. 4 is a schematic representation of a base unit, a telescopic element, and the robotic arm according to at least one embodiment.

In this latter regard, the swivel unit 64 of each robot arm 100, 200 may be mounted on a telescopically extendable element 34, shown in FIG. 4, which itself is mounted to the parlour floor by means of a base unit 32. It will be understood that the platform 3 rotates past each base unit 32 which remains in a fixed location in the parlour 1. Each extendable element 34 is telescopically extendable in a generally tangential direction relative to the platform 3. Each robot arm 100, 200 may be thereby moved along a part circular path with the platform 3 so that the position of the robot arm 100, 200 relative to a particular milking stall 5 may be maintained through a predetermined angle of platform rotation. It will be understood that this angle is, in part, determined by the extent to which the telescopic element may be extended. Furthermore, in order to assist in maintaining a constant relative position between each robot arm 100, 200 (specifically, the swivel unit 64) and the associated stall 5, the relevant base unit 32 may be rotatable so as to allow the extendable element 34 to rotate in a plane parallel with the parlour floor.

In the embodiments described above wherein robot arms are positioned so as to operate in close proximity to one another, it will be understood that a common volume will exist which is within the working/operating range of each robot aim such that a collision between the arms is possible. This common volume is considered by the electronic control system as a plurality of sub-volumes (for example, a matrix of sub-volumes). If a robot arm is moved to locate in one or more of these sub-volumes, then the control system will ensure that the other robot arm is moved in such a way so as to not be located in these sub-volumes. In this way, more than one robot arm is prevented from being located in a given sub-volume at the same time. In order to ensure adequate clearance between robot arms, the electronic control system may prevent a robot arm from moving into a sub-volume adjacent a sub-volume occupied by another robot arm.

It will be understood that each robot arm may send electronic signals conferring information regarding its activity. This information typically relates to the progress being made in completing a servicing task. The communication of this information may be made by a robot arm to a central electronic control system, which controls movement of several robot arms as described above. Alternatively, this information may be sent from a robot arm directly to one or more other robot arms so that each of these other robot arms may individually modify their own activity as deemed necessary in view of the received information. For example, the information transmitted by a robot arm may relate to the current position of that arm. On receiving such information from a neighbouring robot arm, a further robot arm may determine that its own movement should be modified in order to avoid a collision with the neighbouring robot arm.

The present invention is not limited to the specific embodiments described above. Alternative arrangements will be apparent to a reader skilled in the art. For example, the teat cup carrying means may be capable of carrying more than one teat cup (for instance, four teat cups) simultaneously, whilst being capable of picking-up and/or attaching/putting down teat cups individually (i.e. one at a time). In this way, the number of movements made by a robot arm from the teat cup magazine to the animal is reduced from four (when the teat cups are picked-up and moved individually) to one (when the teat cups are all moved together from the magazine to the animal together). The teat cup carrying means may be provided with a plurality (e.g. four) teat cup receivers for receiving a teat cup. Each receiver may be a gripper or may comprise an electro-magnet operable independently of electro-magnets associated with other receivers.

The invention claimed is:

1. A parallel rotary milking parlour, comprising:
   a rotatable platform;
   neighboring milking stalls arranged side by side circumferentially in a parallel configuration along the platform so that each animal stands in one stall so as to face radially inward towards a center of rotation of the platform, each stall comprising a teat cup magazine and plural teat cups removably located within the magazine; and
   an automatic system comprising of first and second robot arms and an electronic control system,
   the control system controlling movement of the two robot arms coordinated with rotary movement of the platform, each robot arm further controlled to automatically attach the teat cups to teats of an animal within the stall,
   each robot arm located adjacent the platform and comprised of i) first, second, third arm sections connected to one another by elbow joints, ii) a swivel unit fixedly mounted at one location, the first arm section extending from the swivel unit and rotatable about a central axis of the swivel unit, and iii) a teat cup carrying part pivotably connected at an end of the third arm section,
   the swivel unit of the first robot arm spaced apart from the swivel unit of the second robot arm and positioned so that the first and second robot arms are operable to simultaneously service adjacent stalls, as the platform rotates, with the robot arms moving the teat cups from the magazine into attachment with the teats of the animals in the adjacent stalls,
   each robot arm being sufficiently extendable from the one location, at any single point in time, to service both a first stall positioned immediately adjacent one of the robot arms and a second stall neighboring the first stall, and
   each robot arm being sufficiently extendable from the one location to have a working range spanning a width of three milking stalls.

2. A parallel rotary milking parlour, comprising:
   a rotatable platform;

a plurality of milking stalls located on the platform side by side circumferentially in a parallel configuration so that each animal stands in one stall so as to face radially inward towards a center of rotation of the platform; and first and second robotic manipulation devices located adjacent the platform, the platform moveable relative to the robotic manipulation devices; and the first and second robotic manipulation devices controlled for simultaneously servicing neighboring milking stalls, each robotic manipulation device comprising an arm sufficiently extendable, from one position and at any single point in time, to service both a first stall positioned immediately adjacent one of the robotic manipulation devices and a second stall neighboring the first stall.

3. A milking parlour according to claim 2, wherein, in use, each robotic manipulation device services a milking stall as said stall moves from the position of said second stall to the position of said first stall upon movement of the platform.

4. A milking parlour according to claim 2, wherein the first and second robotic manipulation devices are spaced from one another by a distance substantially equal to a circumference width dimension of a milking stall which extends in the direction of movement of the platform.

5. A milking parlour according to claim 2, wherein the platform is moveable relative to a floor of the parlour and wherein the first and second robotic manipulation devices are provided with a base moveable relative to said floor.

6. A milking parlour according to claim 5, wherein the or each base is moveable in the direction of movement of the platform, and the or each base is moveable at a speed which maintains the robotic manipulation device provided with said base in a substantially constant position relative to an individual milking stall on the platform.

7. A milking parlour according to claim 5, further comprising a first telescopically extendable element with which the base of the first robotic manipulation device is moved, and a second telescopically extendable element with which the base of the second robotic manipulation device is moved.

8. A milking parlour according to claim 7, wherein at least one of said robotic manipulation devices is carried by the extendable element with which the one robotic manipulation device is moved.

9. A milking parlour according to claim 2, wherein the first and second manipulation devices service milking stalls in the same way.

10. A milking parlour according to claim 9, wherein said servicing of a milking stall comprises attaching teat cups to the teats of an animal located within said stall.

11. A milking parlour according to claim 2, wherein the parlour further comprises an entrance preventing, in use, entry to the platform of more than one animal at any one time, the entrance to the platform spanning no more than one milking stall.

12. A milking parlour according to claim 2, wherein information regarding the activity of a robotic manipulation device is sent electronically from said device.

13. A milking parlour according to claim 12, wherein said information comprises data recording a current real-time position of the robotic manipulation device and/or the number of teat cups successfully attached to a cow positioned in a milking stall currently being serviced by the robotic manipulation device.

14. A milking parlour according to claim 2, wherein the milking parlour comprises two or more robotic manipulation devices including at least the first and second robotic manipulation devices, and information regarding the activity of two of the two or more robotic manipulation devices is exchanged electronically between said two robotic manipulation devices.

15. A milking parlour according to claim 2, wherein an electronic control system determines the position of each robotic manipulation device and determines movement of each robotic manipulation device so as to avoid said devices colliding with one another.

16. A milking parlour according to claim 15, wherein a common volume of an area within a working range of both the first and second robotic manipulation devices is considered by the electronic control system as a plurality of sub-volumes, said control system preventing more than one robotic manipulation device from locating in the same sub-volume at the same time.

17. A milking parlour according to claim 2, wherein, upon completing the servicing of one stall by one of the robotic manipulation devices, an electronic control system directs said robotic manipulation device to begin servicing a further stall without waiting for the servicing of the stall by the other of the robotic manipulation devices to be completed.

18. A milking parlour according to claim 17, wherein said further stall is said stall being serviced by the other of the robotic manipulation devices whereby the first and second robotic manipulation devices assist one another in completing the servicing of said stall.

19. A milking parlour according to claim 2, wherein the arm of each robotic manipulation device is sufficiently extendable to provide each robotic manipulation device with a working range spanning the width of at least two stalls.

20. A method of operating a milking parlour of claim 2, the method comprising the step of controlling the first and second robotic manipulation devices so that said devices simultaneously service both the first stall and the second stall on the platform.

21. A method according to claim 20, wherein each robotic manipulation device is controlled so as to service every other milking stall on the platform.

22. A method according to claim 20, wherein each robotic manipulation device is moved, as a whole, at a speed which maintains said robotic manipulation device in a substantially constant position relative to a corresponding milking stall on the platform.

23. A method according to claim 22, wherein each robotic manipulation device is moved by means of a telescopically extendable element.

24. A method according to claim 20, wherein the first and second manipulation devices service milking stalls in the same way.

25. A method according to claim 20, wherein said servicing of a milking stall comprises the step of attaching a teat cup to the teat of an animal located within said stall.

26. A method according to claim 20, wherein after having completed the servicing of a milking stall, the robotic manipulation device associated with said stall begins servicing a further stall without waiting for the other of the robotic manipulation devices to complete the servicing of a milking stall.

27. A method according to claim 26, wherein said further stall is said stall being serviced by the other of the robotic manipulation devices whereby the first and second robotic manipulation devices assist one another in completing servicing of said stall.

* * * * *